US012587795B2

(12) United States Patent
Li et al.

(10) Patent No.: US 12,587,795 B2
(45) Date of Patent: Mar. 24, 2026

(54) ELECTROMAGNETIC MICROPHONE

(71) Applicant: AAC Microtech (Changzhou) Co., Ltd., Changzhou (CN)

(72) Inventors: Bo Li, Changzhou (CN); Zhuanzhuan Zhao, Changzhou (CN); Kaijie Wang, Changzhou (CN); Yu Chen, Singapore (SG); Rui Zhang, Changzhou (CN); Yang Li, Changzhou (CN)

(73) Assignee: AAC Microtech (Changzhou) Co., Ltd., Changzhou (CN)

( * ) Notice: Subject to any disclaimer, the term of this patent is extended or adjusted under 35 U.S.C. 154(b) by 169 days.

(21) Appl. No.: 18/742,874

(22) Filed: Jun. 13, 2024

(65) Prior Publication Data

US 2025/0227420 A1 Jul. 10, 2025

Related U.S. Application Data

(63) Continuation of application No. PCT/CN2024/071302, filed on Jan. 9, 2024.

(51) Int. Cl.
*H04R 19/04* (2006.01)

(52) U.S. Cl.
CPC ......... *H04R 19/04* (2013.01); *H04R 2410/03* (2013.01)

(58) Field of Classification Search
CPC ................ H04R 19/04; H04R 2410/03; H04R 19/016; H04R 15/00; H04R 2201/003; H04R 21/02
USPC ................................ 381/113, 115, 171, 175
See application file for complete search history.

(56) References Cited

U.S. PATENT DOCUMENTS

| | | | | |
|---|---|---|---|---|
| 6,721,429 | B1 * | 4/2004 | Akamatsu | H04R 19/04 381/115 |
| 9,351,062 | B2 * | 5/2016 | Inoda | H04R 1/38 |
| 11,109,162 | B2 * | 8/2021 | Zou | H04R 1/04 |
| 11,589,169 | B2 * | 2/2023 | Niekiel | H04R 9/00 |
| 2010/0111344 | A1 * | 5/2010 | Sun | B81B 7/0029 381/355 |
| 2016/0037265 | A1 * | 2/2016 | Khenkin | H04R 19/04 381/174 |
| 2021/0410340 | A1 * | 12/2021 | Meeusen | H04R 1/04 |

* cited by examiner

*Primary Examiner* — Xu Mei
(74) *Attorney, Agent, or Firm* — Wiersch Law Group

(57) ABSTRACT

The present disclosure discloses an electromagnetic microphone including: a housing; a circuit board; and a sound transducer, including: a substrate including a back cavity, a vibrator mounted on a side of the substrate away from the circuit board and covering the back cavity, including: a membrane; and a magnetic component mounted on the membrane and configured to generate magnetic field; a coil located within the magnetic field of the magnetic component; a sound hole penetrated on the housing or the circuit board is configured to communicate with the back cavity; when external sound wave transmitted from the sound hole and the back cavity acts on the membrane, the magnetic component and the coil interact to generate electrical signal. The electromagnetic microphone in the present disclosure has higher sensitivity, reliability and stability.

18 Claims, 15 Drawing Sheets

ELECTROMAGNETIC MICROPHONE

FIELD OF THE PRESENT DISCLOSURE

The present disclosure relates to acoustic-electric conversion technologies, especially relates to an electromagnetic microphone.

DESCRIPTION OF RELATED ART

Traditional microphone and MEMS microphone generally use flexible membrane to detect sound wave according to its displacement under sound wave.

In related art, capacitance technology is commonly utilized in the microphones to detect acoustic signals. Specifically, the capacitance change between the flexible membrane and the fixed back plate is detected. The membrane vibrate according to the pressure change resulted by external sound wave. Thus, the capacitance between the membrane and the back plate varies with their intermediate distance for achieving acoustic-electric conversion. However, the MEMS microphone in related art has lower reliability caused by high impedance, high noise, and the absorption between the membrane and the back plate.

Therefore, it is necessary to provide an improved electromagnetic microphone to overcome the problems mentioned above.

SUMMARY OF THE INVENTION

One object of the present disclosure is to provide an electromagnetic microphone without back plate.

An electromagnetic microphone including: a housing; a circuit board engaged with the housing for enclosing a receiving space; and a sound transducer received in the receiving space, including: a substrate including a back cavity, a vibrator mounted on a side of the substrate away from the circuit board and covering the back cavity, including: a membrane; and a magnetic component mounted on the membrane and configured to generate magnetic field; a coil located within the magnetic field of the magnetic component; wherein a sound hole penetrated on the housing or the circuit board is configured to communicate with the back cavity; when external sound wave transmitted from the sound hole and the back cavity acts on the membrane, the magnetic component and the coil interact to generate electrical signal.

As an improvement, the magnetic component is configured to generate anisotropic magnetic field.

As an improvement, a projection of the magnetic component along a vibration direction of the membrane is located within the back cavity.

As an improvement, the circuit board includes an outer surface and an inner surface opposite to each other; the substrate is mounted on the outer surface; the coil includes a coil body, a first lead wire and a second lead wire both led out from the coil body; the magnetic field generated by the magnetic component acts on the coil body.

As an improvement, the coil is integrated into the circuit board.

As an improvement, the first lead wire and the second lead wire extend to the outer surface for electrically connecting with external circuit.

As an improvement, the first lead wire includes a first solder pad formed on the outer surface for electrically connecting with external circuit; the second lead wire includes a second solder pad formed on the outer surface for electrically connecting with external circuit.

As an improvement, further including an ASIC chip mounted on the inner surface; the first lead wire and the second lead wire extend to the inner surface for electrically connecting with the ASIC chip.

As an improvement, the coil body includes multiple planar coil layers spaced and stacked along a vibration direction of the membrane, and an electric connection portion for electrically connecting adjacent planar coil layers in series; the circuit board includes a connection hole arranged between adjacent planar coil layers; the connection hole is filled with the electric connection portion; the multiple planar coil layers includes a first planar coil layer leading out the first lead wire, and a second planar coil layer leading out the second lead wire.

As an improvement, the coil is integrated into the substrate.

As an improvement, the first lead wire and the second lead wire both extend to a side of the substrate away from the membrane; the circuit board includes a connection circuit integrated therein extending from the inner surface to the outer surface to electrically connect with external circuit; the connection circuit electrically connects with the first lead wire and the second lead wire on the inner surface.

As an improvement, the connection circuit includes a third solder pad and a fourth solder pad formed on the outer surface for electrically connecting with external circuit.

As an improvement, further including an ASIC chip mounted on the inner surface; the circuit board includes a connection circuit integrated therein; the first lead wire and the second lead wire both extend to a side of the substrate away from the membrane; one end of the connection circuit is electrically connected with the first lead wire and the second lead wire on the inner surface, the other end of the connection circuit is electrically connected with the ASIC chip on the inner surface.

As an improvement, the substrate includes a first insulation layer fixed to the membrane, a second insulation layer fixed to the inner surface, and an intermediate insulation layer; the second insulation layer includes a first hole and a second hole penetrating thereon; the second hole is filled with the second lead wire; the intermediate insulation layer includes a through hole and a third hole penetrating thereon, the third hole communicates with the first hole; the first lead wire includes a first electric portion filling the first hole, and a second electric portion filling the third hole; the coil body is sandwiched between the first insulation layer and the second insulation layer; the coil body comprises multiple planar coil layers spaced from each other, and an electric connection portion for electrically connecting adjacent planar coil layers in series; the intermediate insulation layer is arranged between every two adjacent planar coil layer; the through hole is filled with the electric connection portion.

As an improvement, the ASIC chip includes a signal process module electrically connecting with the coil, and a signal detection module electrically connecting with the signal process module; after being processed by the signal process module, the electrical signal is received and then output by the signal detection module for extracting information about the external sound wave.

As an improvement, the signal detection module is configured to output a control signal to the coil according to the electrical signal for enabling the coil to generate a reverse force counteracted with the electromagnetic force of the magnetic component.

As an improvement, the signal process module includes a signal amplification unit electrically connected with the coil, an analog-to-digital conversion unit electrically connected with the signal amplification unit, and a filtering unit connecting the analog-to-digital conversion unit with the signal detection module.

BRIEF DESCRIPTION OF THE DRAWINGS

The accompanying drawings illustrate embodiments and constitute part of the specification, and together with the specification, serve to explain exemplary embodiments of the present disclosure. The accompanying drawings shown are only for illustrative purposes and do not limit the scope of the claims. In all the accompanying drawings, same reference signs refer to similar but not necessarily identical elements.

DETAILED DESCRIPTION OF THE EXEMPLARY EMBODIMENTS

In order to make the inventive objectives, features, and advantages of the present disclosure more understandable, the technical solutions in embodiments of the present disclosure will be described clearly and completely below with reference to the accompanying drawings in the embodiments of the present disclosure. It is apparent that the described embodiments are merely some of rather than all of the embodiments of the present disclosure. All other embodiments acquired by those skilled in the art without creative efforts based on the embodiments in the present disclosure shall fall within the protection scope of the present disclosure.

Please refer to FIGS. 1-7, an electromagnetic microphone provided by an exemplary embodiment of the present disclosure includes a circuit board 1, a housing 3 engaged with the circuit board 1 for enclosing a receiving space A, and a sound transducer 5 received in the receiving space A. In the present disclosure, the housing 3 is made of metal having electromagnetic shielding performance.

A sound hole B penetrated on the housing 3 or the circuit board 1 is configured to communicate with the receiving space A. When external sound wave transmitted from the sound hole B acts on the sound transducer 5, the sound transducer 5 converts the sound wave into electrical signal.

Figure 1:
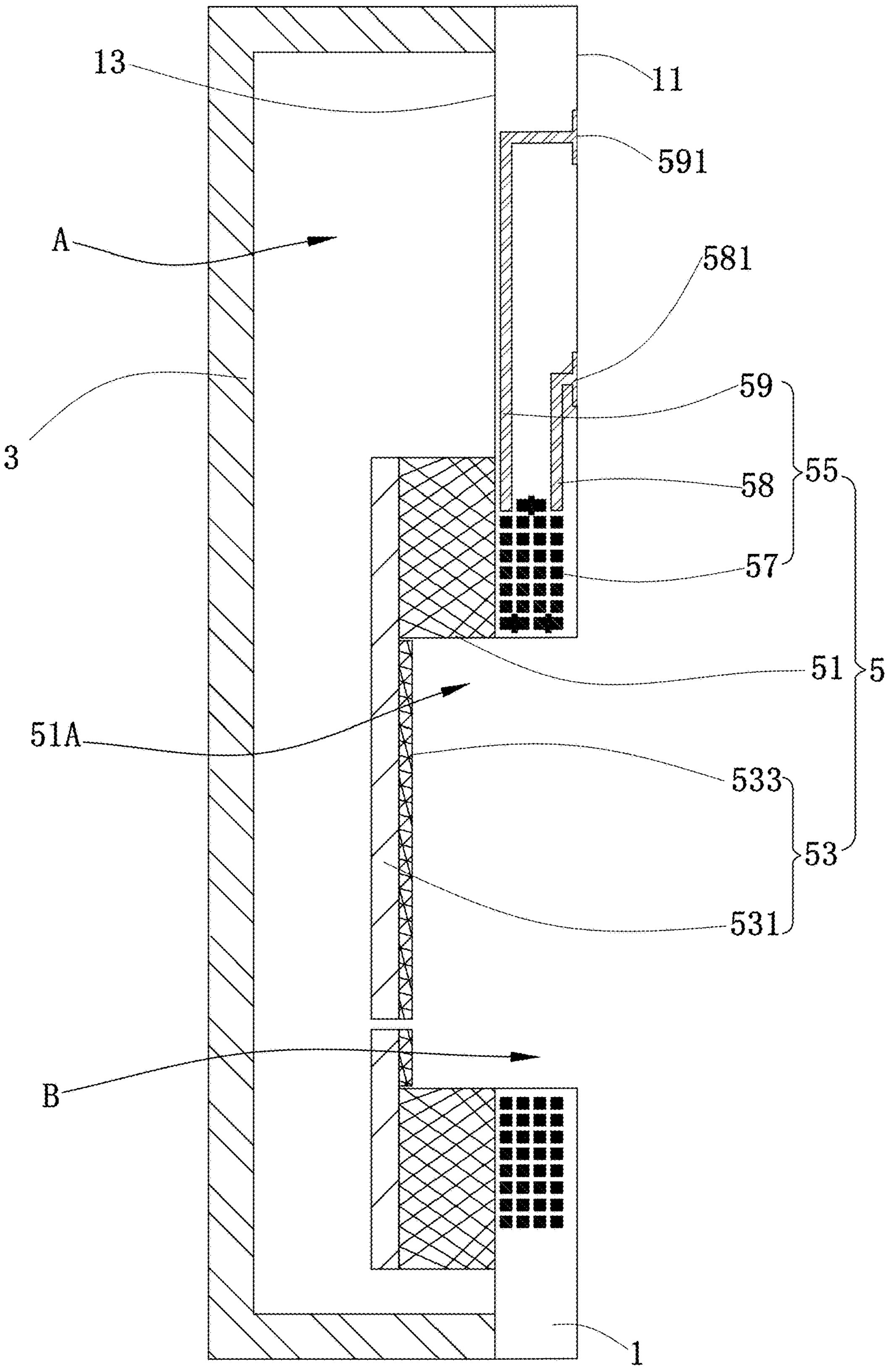
FIG. 1 is a schematic diagram of an electromagnetic microphone in accordance with first exemplary embodiment of the present disclosure.
Figure 2:
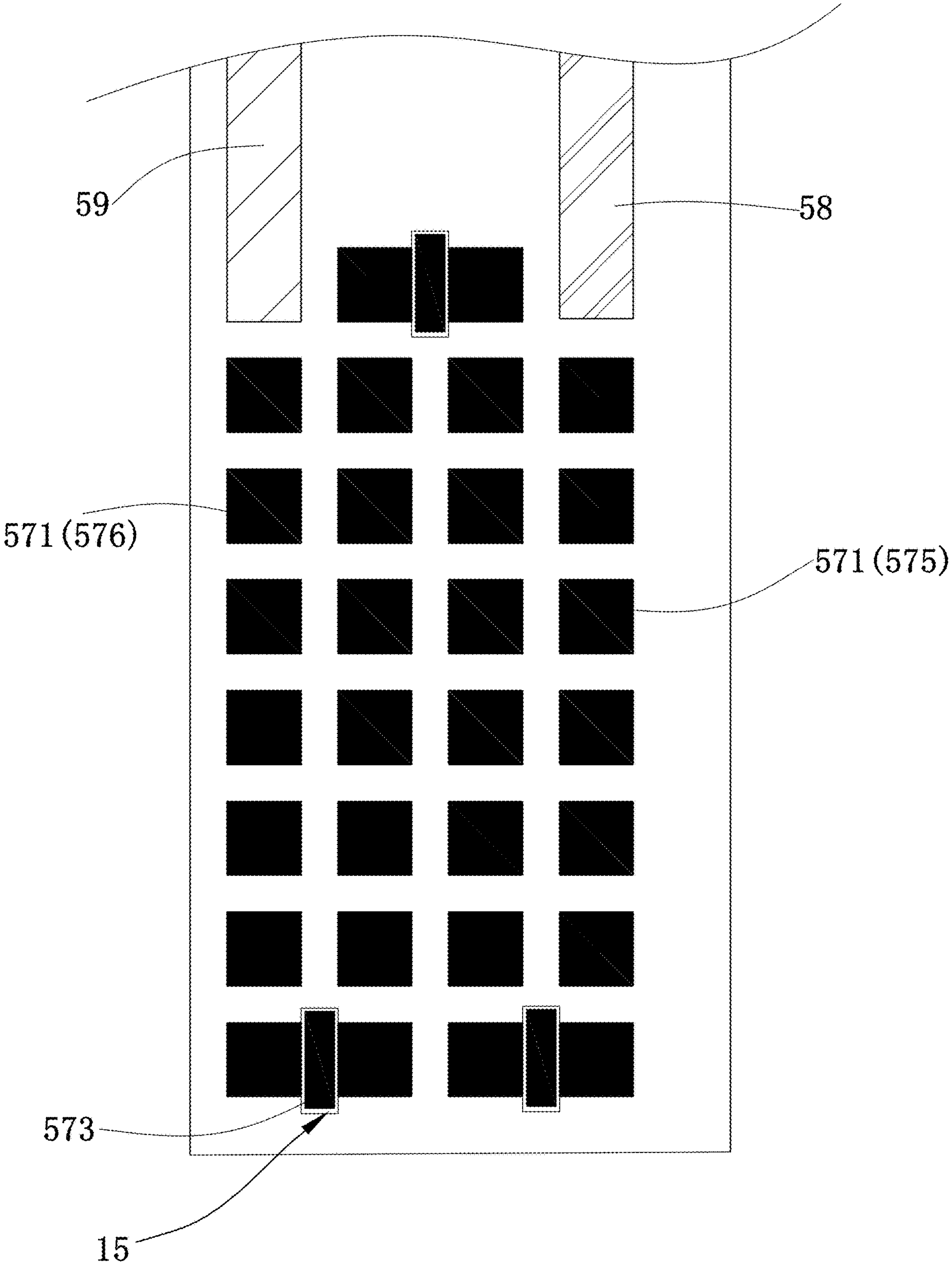
FIG. 2 is a schematic diagram of part of a circuit board integrated with a coil of the electromagnetic microphone in FIG. 1.
Figure 3:
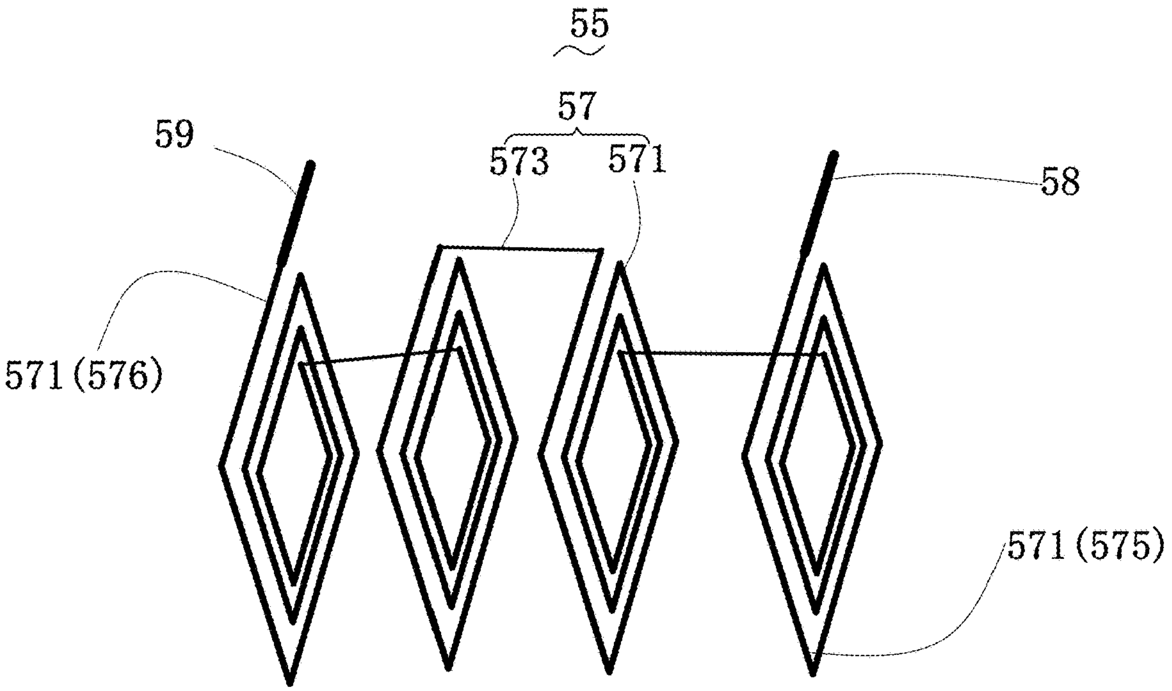
FIG. 3 is a schematic diagram of the coil integrated into the circuit board in FIG. 2.
Figure 4:
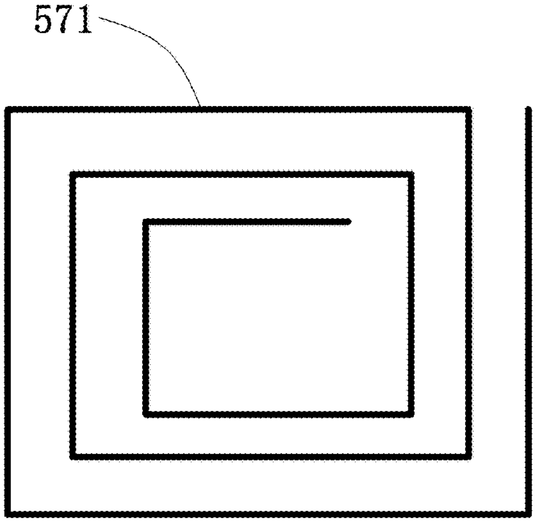
FIG. 4 is a top view diagram of a planar coil layer of the coil in FIG. 3.

As shown in FIG. 1, in one embodiment, the sound hole B is provided on the circuit board 1. The circuit board 1 includes an outer surface 11 and an inner surface 13 opposite to each other. The inner surface 11 is provided to enclose the receiving space A.

The sound transducer 5 includes a substrate 51 with a back cavity 51A communicated with the sound hole B, a vibrator 53 mounted on a side of the substrate 51 away from the circuit board 1 and covering the back cavity 51A, and a coil 55. Specifically, the substrate 51 is mounted on the inner surface 11 of the circuit board 1. The vibrator 53 includes a membrane 531 mounted on the substrate 51, and a magnetic component 533 mounted on the membrane 531 and configured to generate magnetic field.

Figure 5:
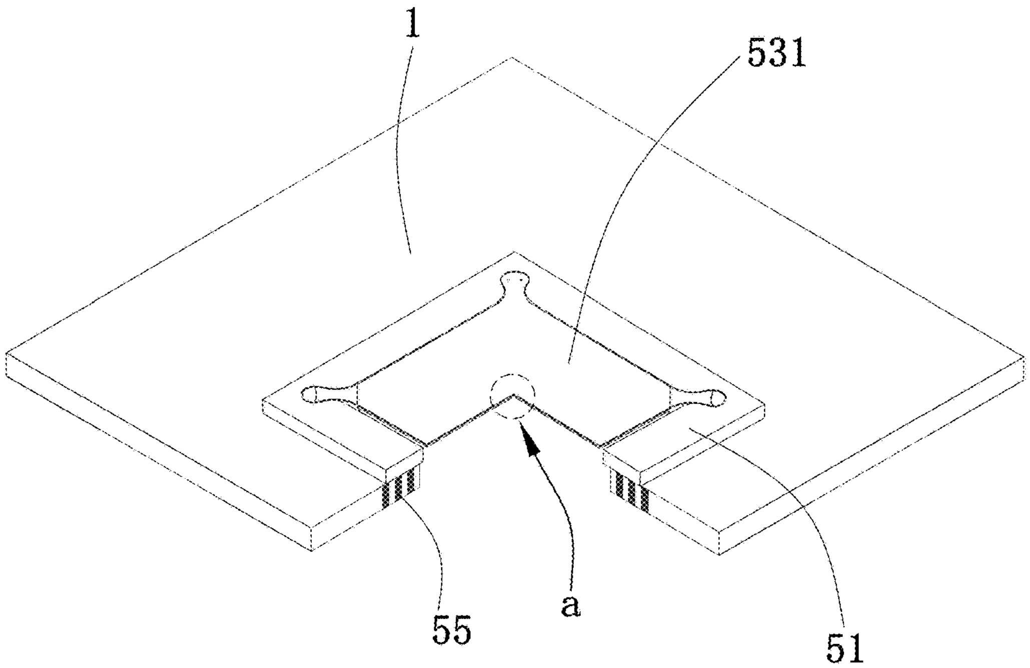
FIG. 5 is an isometric view of part of the assembly of a circuit board and a sound transducer of the electromagnetic microphone in FIG. 1.
Figure 6:
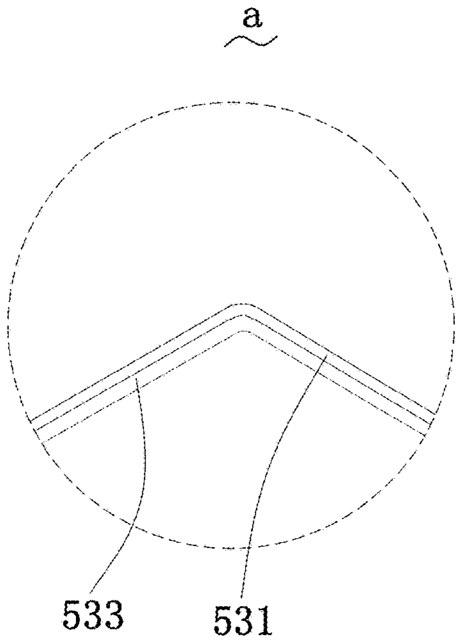
FIG. 6 is an enlarged view of part A in FIG. 5.
Figure 7:
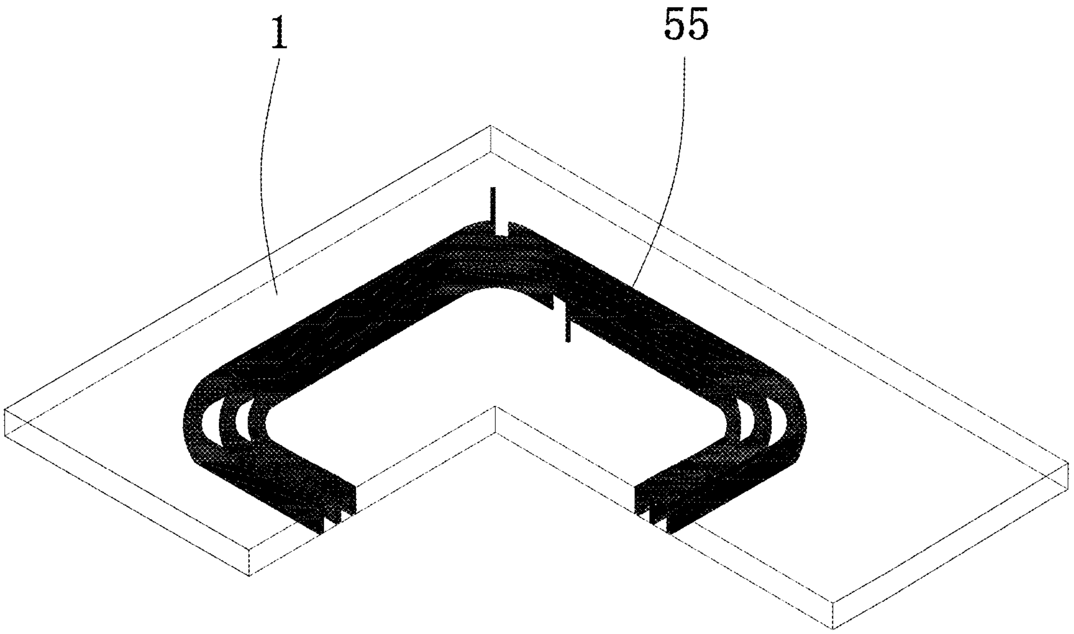
FIG. 7 is an isometric view of the circuit board integrated with a coil in FIG. 5.

As shown in FIG. 1 and FIG. 5, the membrane 531 covers the back cavity 51A. The magnetic component 533 is fixed to a side of the membrane 531 facing the circuit board 1. It should be understood that the magnetic component 533 could be provided on either side or both sides of the membrane 531.

In one embodiment, a projection of the magnetic component 533 along a vibration direction of the membrane 531 is located within the back cavity 51A. Thus, the magnetic component 533 and the membrane 531 lie in the same plane.

In one embodiment, the magnetic component 533 is a magnetic film. The magnetic film is made of hard magnetic material such as iron/platinum by means of deposition or sputtering forming process for improving the connection intensity between the magnetic component 533 and the membrane 531.

Moreover, the magnetic component 533 is configured to generate anisotropic magnetic field. The coil 55 is integrated into the circuit board 1. When external sound wave transmitted from the sound hole B and the back cavity 51A acts on the membrane 531, the membrane 531 and the magnetic component 533 vibrate simultaneously, thus resulting in distance change between the coil 55 and the magnetic component 533. Thus, the magnetic component 533 and the coil 55 interact to generate electrical signal according to electromagnetic induction law for acoustic-electrical conversion. By detecting the current and voltage generated by the coil 55, external acoustic signals can be obtained.

Furthermore, the coil 55 includes a coil body 57, a first lead wire 57 and a second lead wire 58 both led out from the coil body 57. The magnetic field generated by the magnetic component 533 acts on the coil body 57.

In one embodiment, the coil body 57 includes multiple planar coil layers 571 spaced and stacked along a vibration direction of the membrane 531, and an electric connection portion 573 for electrically connecting adjacent planar coil layers 571 in series. The circuit board 1 includes a connection hole 15 arranged between adjacent planar coil layers 571, and the connection hole 15 is filled with the electric connection portion 573.

The multiple planar coil layers 571 includes a first planar coil layer 575 leading out the first lead wire 58, and a second planar coil layer 576 leading out the second lead wire 59.

As shown in FIGS. 3-7, the planar coil layer 571 is in a rectangle shape. Correspondingly, the coil body 57 is in a rectangle shape.

The first lead wire 58 and the second lead wire 59 extend to the outer surface 11 of the circuit board 1 for electrically connecting with external circuit. The current and the voltage generated by the coil 55 is detected through the external circuit.

As shown in FIG. 1, in order to facilitate the electrical connection between the first lead wire 58 and the second lead wire 59 and the external circuit, the first lead wire 58 includes a first solder pad 581 formed on the outer surface 11 for electrically connecting with external circuit; the second lead wire 59 includes a second solder pad 591 formed on the outer surface 11 for electrically connecting with external circuit.

It should be understood that the circuit board 1 includes multiple conductive layers. Each planar coil layer 571 can be served as one conductive layer.

Figure 8:
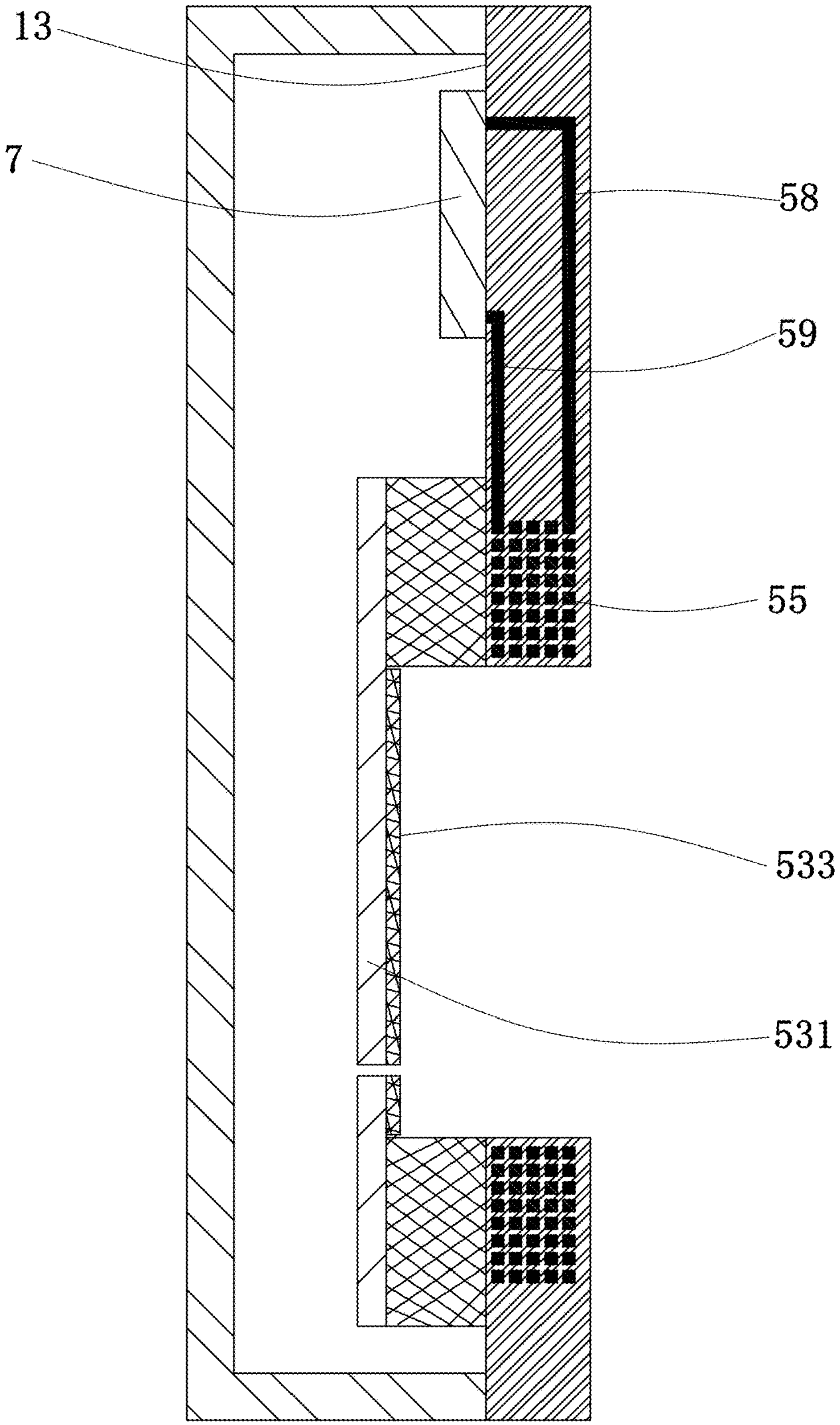
FIG. 8 is a schematic diagram of an electromagnetic microphone in accordance with second exemplary embodiment of the present disclosure.
Figure 9:
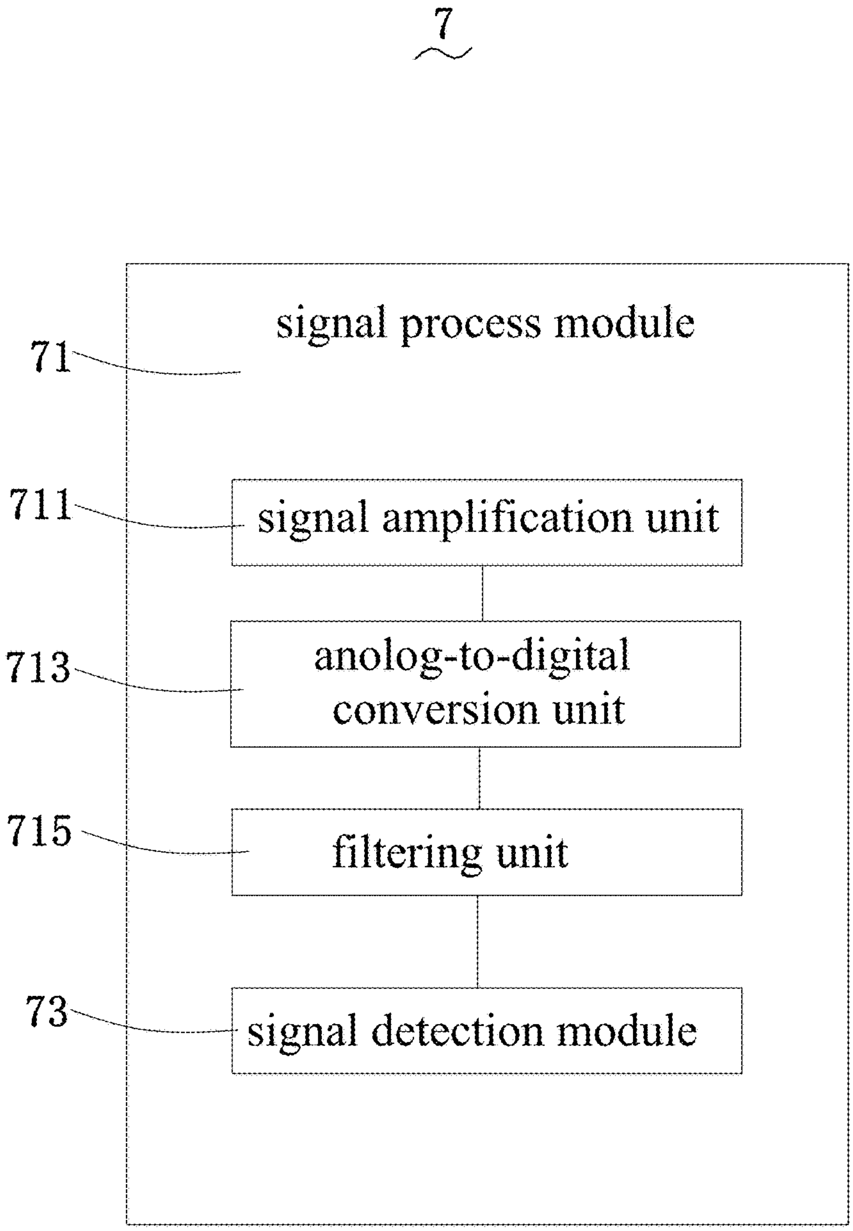
FIG. 9 is a schematic diagram of an ASIC chip of the electromagnetic microphone in the present disclosure.
Figure 10:
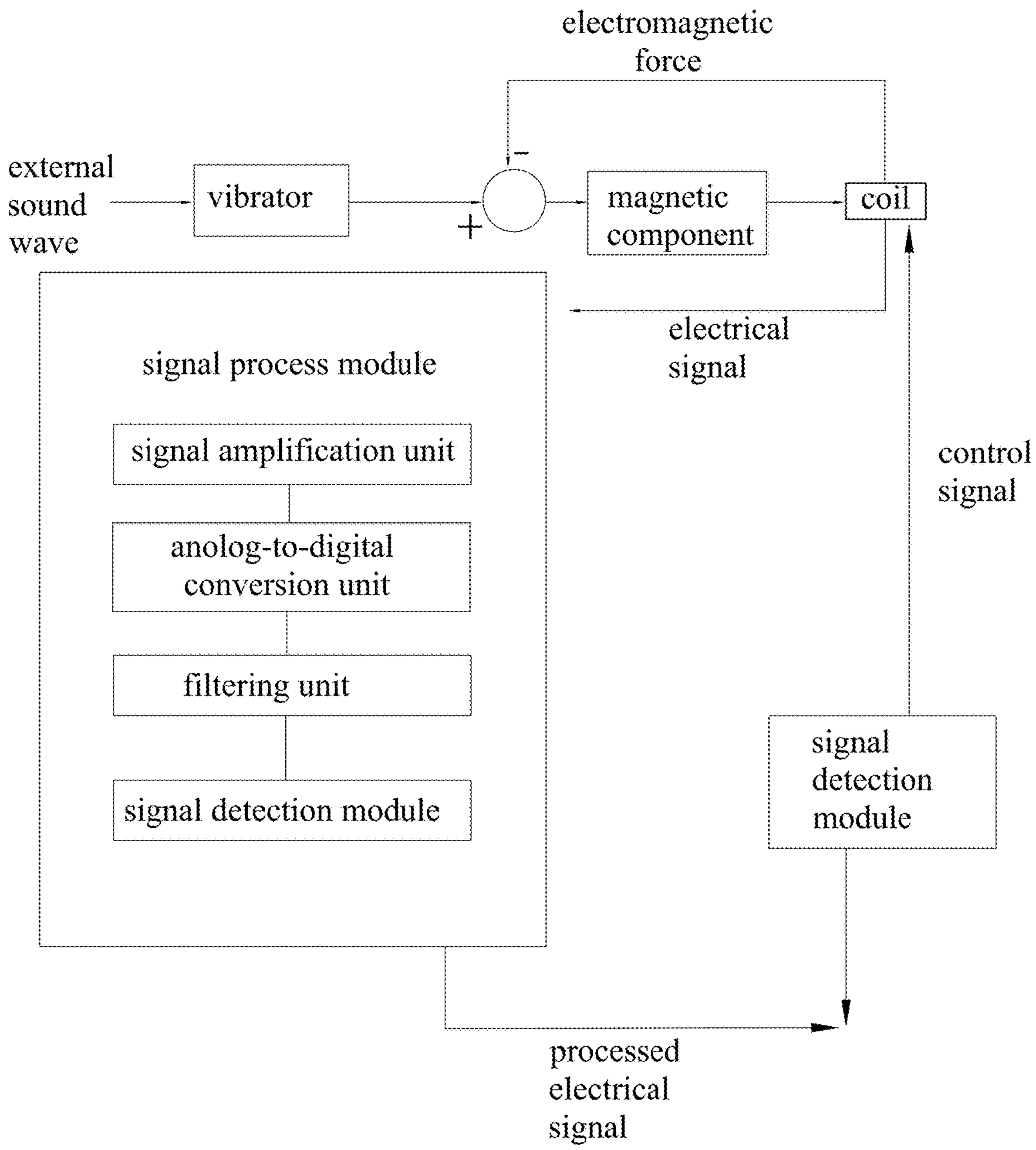
FIG. 10 is a schematic diagram of the operation principle of the electromagnetic microphone in the present disclosure.
Figure 11:
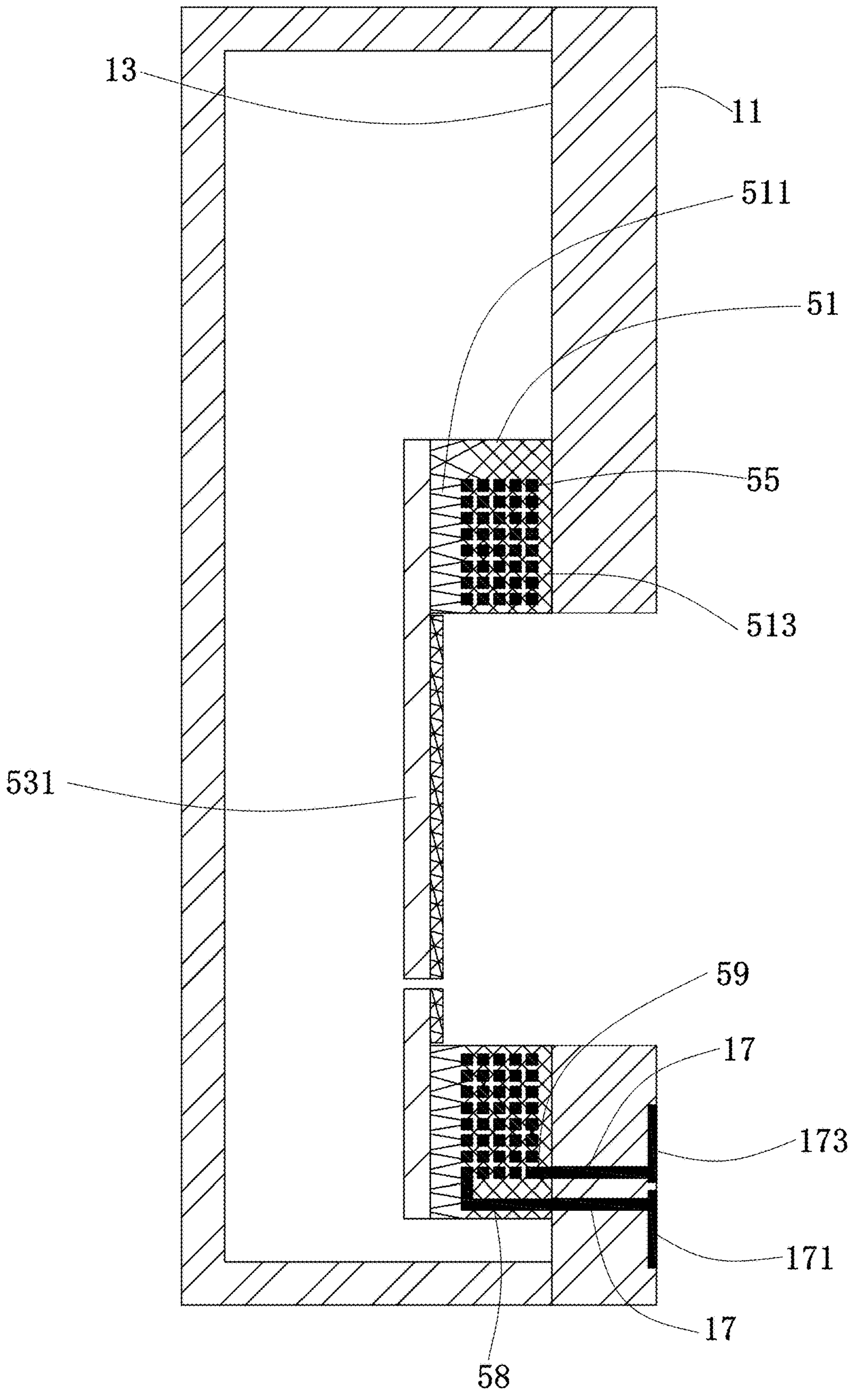
FIG. 11 is a schematic diagram of an electromagnetic microphone in accordance with third exemplary embodiment of the present disclosure.
Figure 12:
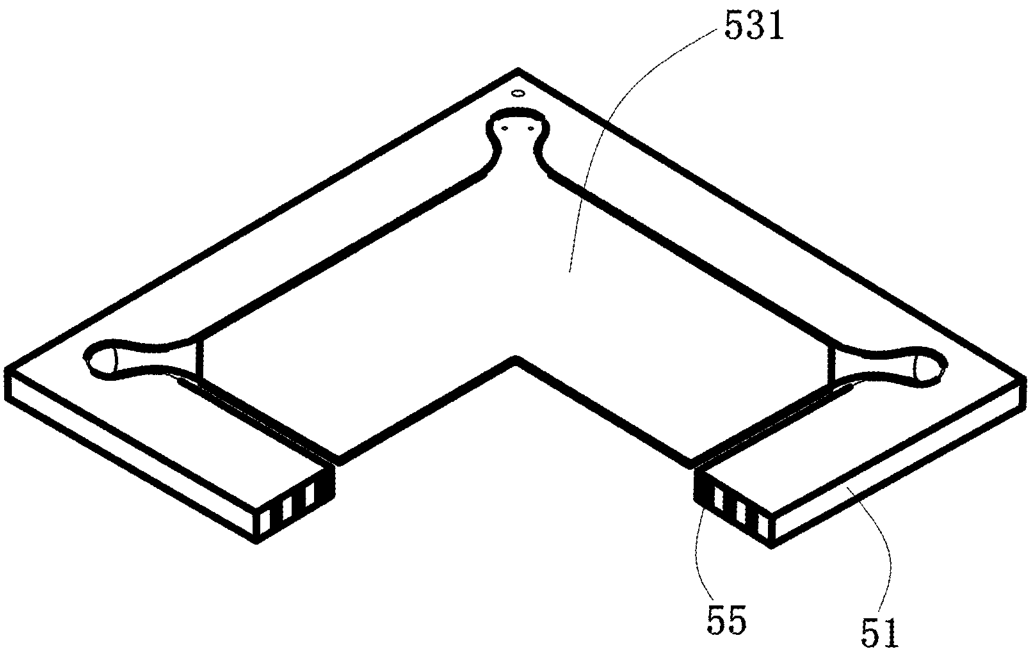
FIG. 12 is an isometric view of part of the sound transducer of the electromagnetic microphone in FIG. 11.
Figure 13:
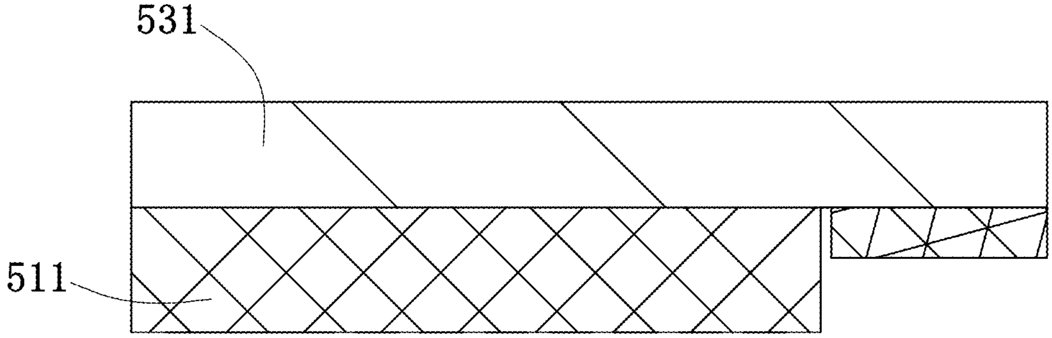
FIG. 13 is a schematic diagram of depositing a first insulation layer on a membrane.
Figure 14:
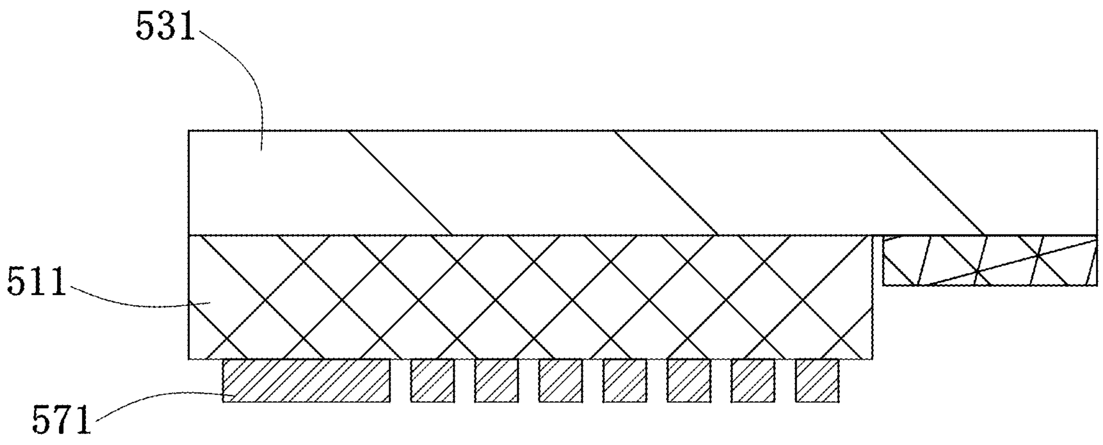
FIG. 14 is a schematic diagram of depositing a planar coil layer on a first insulation layer.
Figure 15:
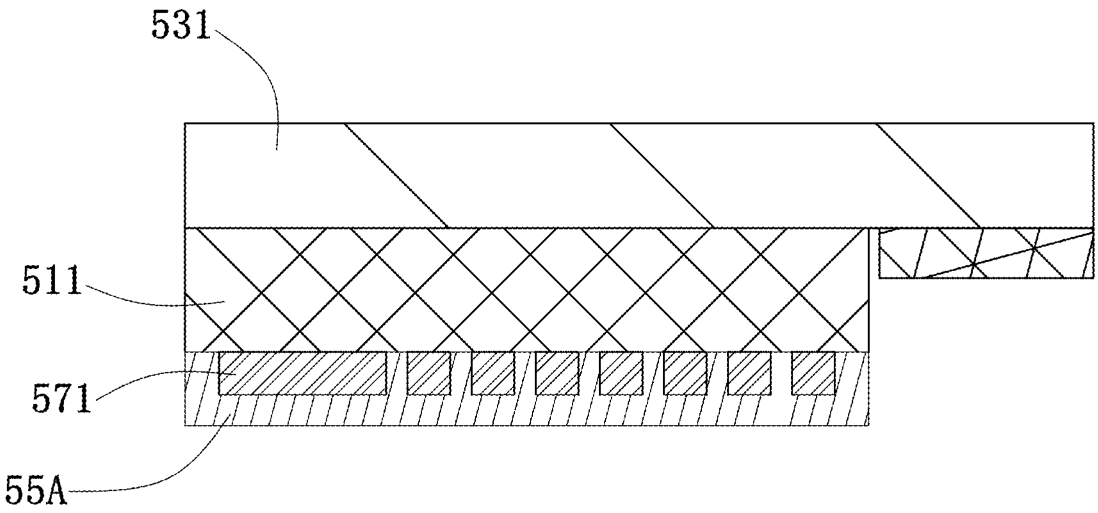
FIG. 15 is a schematic diagram of depositing a raw intermediate insulation layer on the planar coil layer.
Figure 16:
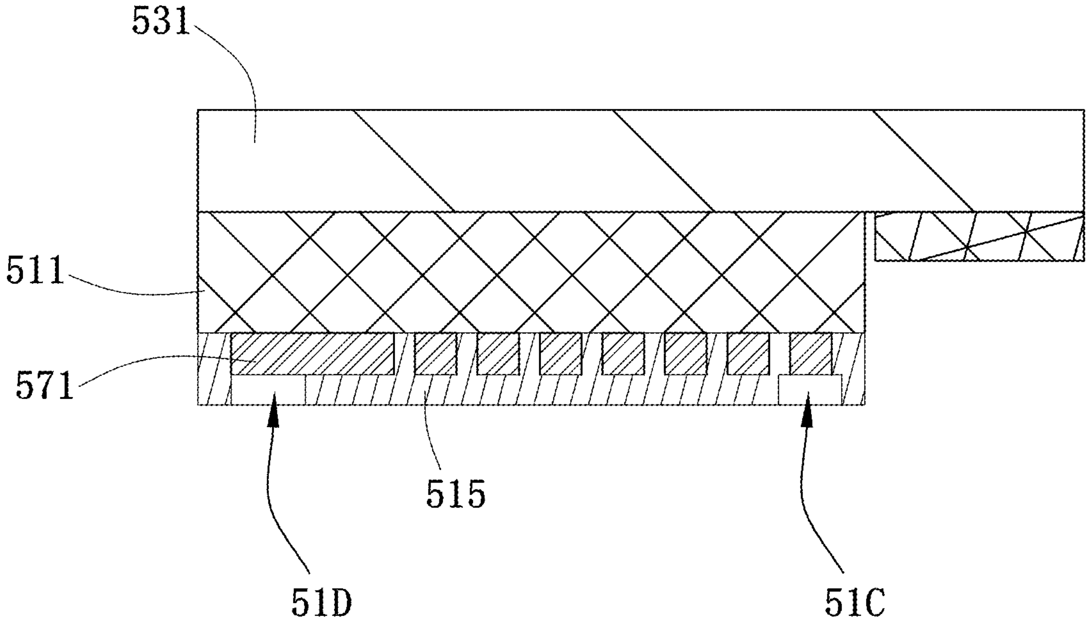
FIG. 16 is a schematic diagram of etching a through hole and a third hole on the raw intermediate insulation layer to obtain an intermediate insulation layer.
Figure 17:
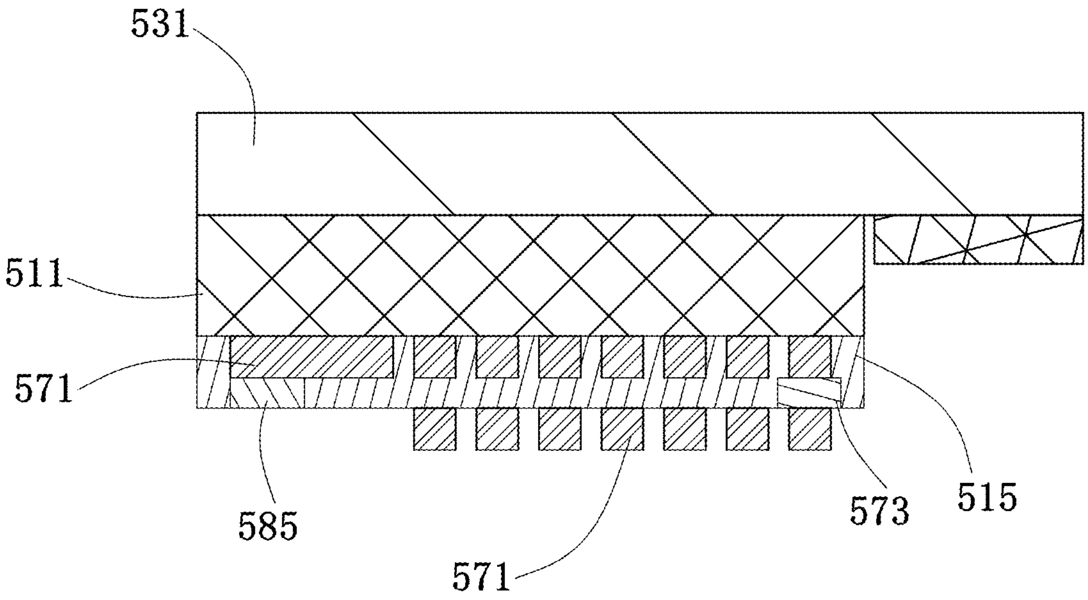
FIG. 17 is a schematic diagram of depositing an electric connection portion into the through hole, depositing a second electric portion into the third hole, and depositing the planar coil layer on the intermediate insulation layer.
Figure 18:
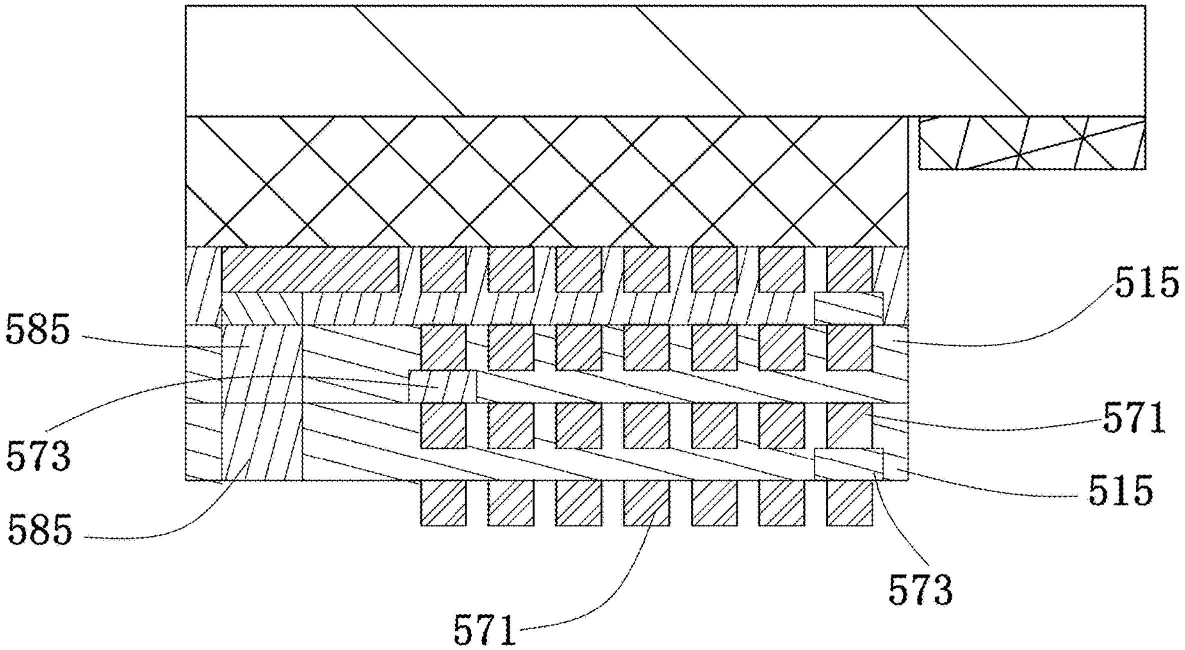
FIG. 18 is a schematic diagram of forming the intermediate insulation layer and the planar coil layer successively.
Figure 19:
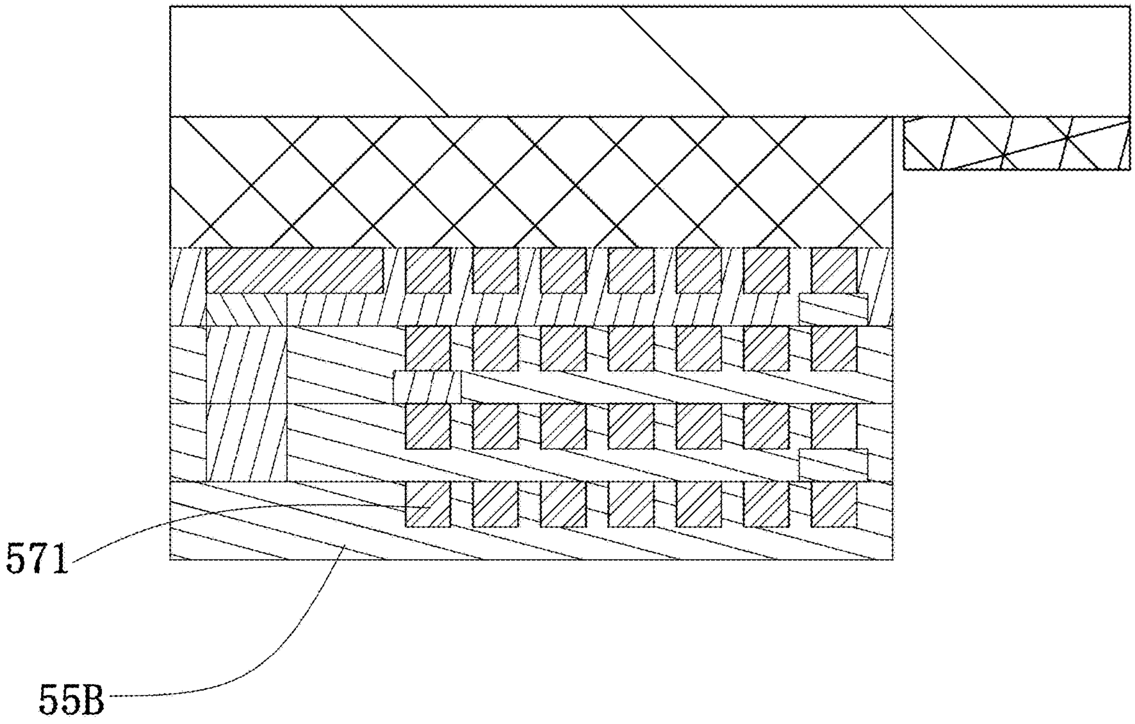
FIG. 19 is a schematic diagram of depositing a raw second insulation layer on the planar coil layer.
Figure 20:
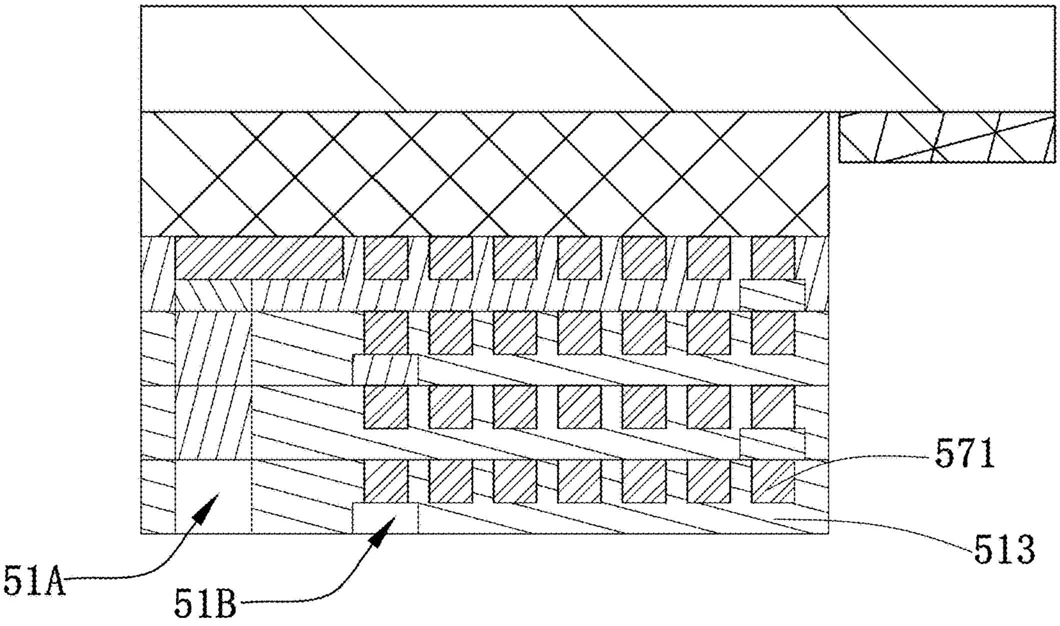
FIG. 20 is a schematic diagram of etching a first hole and a second hole on the raw second insulation layer to obtain a second insulation layer.
Figure 21:
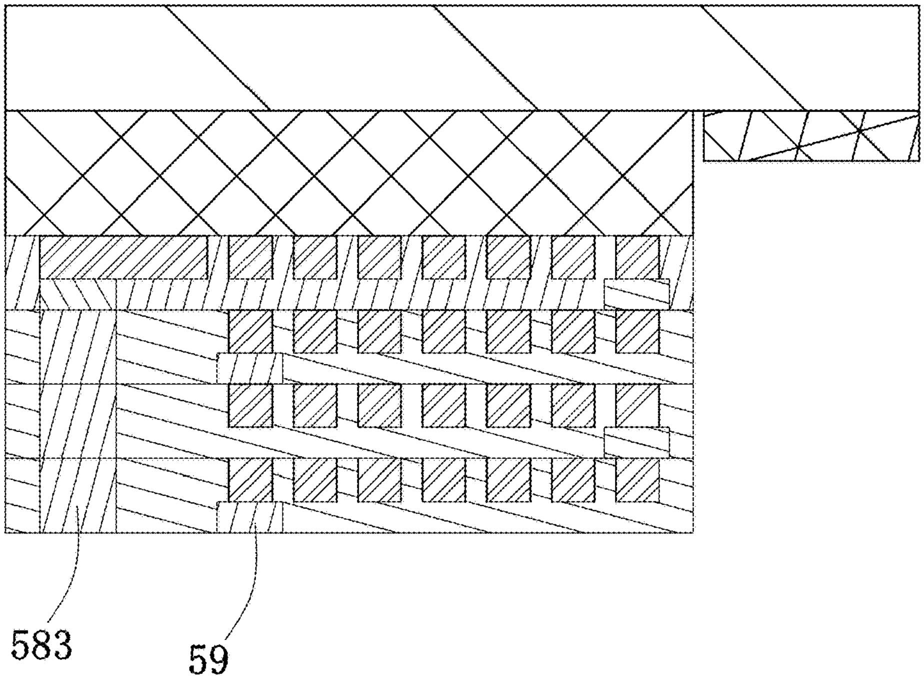
FIG. 21 is a schematic diagram of depositing a first electric portion into the first hole, and depositing a second lead wire into the second hole.

Please refer to FIGS. 8-10, an electromagnetic microphone provided by second exemplary embodiment of the present disclosure is presented. The only difference from the electromagnetic microphone shown in FIGS. 1-7 is that this electromagnetic microphone further includes an ASIC chip 7 mounted on the inner surface 13.

Additionally, the first lead wire 58 and the second lead wire 59 both extend to the inner surface 13 to be electrically connected with the ASIC chip 7. Specifically, the ASIC chip 7 includes a signal process module 71 electrically connected to the coil 55, and a signal detection module 73 electrically connected to the signal process module 71.

When external sound wave acts on the vibrator 53 through the sound hole B to drive the vibrator 53 to vibrate, the vibration of the membrane 531 with the magnetic component 533 thereon brings a distance change between the magnetic component 533 and the membrane 531. Thus, a voltage is generated in the coil 55 according the law of electromagnetic induction, thus achieving acoustic-electric conversion. The electrical signal generated by the coil 55 is received and output by the signal detection module 73 after being processed by the signal process module 71 for extracting information about the external sound wave.

Furthermore, the signal process module 71 includes a signal amplification unit 711 electrically connected with the coil 55, an analog-to-digital conversion unit 713 electrically connected with the signal amplification unit 711, and a filtering unit 715 connecting the analog-to-digital conversion unit 713 with the signal detection module 73.

In one embodiment, the signal detection module 73 is configured to output a control signal to the coil 55 according to the electrical signal for enabling the coil 55 to generate a reverse force counteracted with the electromagnetic force of the magnetic component 533. Therefore, the magnetic microphone can be controlled in a closed loop manner, thus effectively reducing the stiffness of the membrane 531 and improving its sensitivity. Besides, when the magnetic microphone drops at work, the membrane 531 always keeps in initial status via the closed-loop force feedback control, thus effectively improving the stability and reliability of the magnetic microphone.

Please refer to FIGS. 11-21, an electromagnetic microphone provided by third exemplary embodiment of the present disclosure is presented. The only difference from the electromagnetic microphone shown in FIGS. 1-7 is that the coil 55 is integrated into the substrate 51 and the first lead wire 58 and the second lead wire 59 of the coil 55 both extend to a side of the substrate 51 away from the membrane 531.

To be specific, the substrate 51 includes a first insulation layer 511 fixed to the membrane 531, a second insulation layer 513 fixed to the inner surface 13, and an intermediate insulation layer 515. In this embodiment, the second insulation layer 511, the second insulation layer 513, and the intermediate insulation layer 515 are all made of silicon dioxide.

The second insulation layer 513 includes a first hole 51A and a second hole 51B penetrating thereon. The second hole 51B is filled with the second lead wire 59. the intermediate insulation layer 515 includes a through hole 51C and a third hole 51D penetrating thereon. The third hole 51D communicates with the first hole 51A. The first lead wire 58 includes a first electric portion 583 filling the first hole 51A, and a second electric portion 585 filling the third hole 51D.

The coil body 57 is sandwiched between the first insulation layer 511 and the second insulation layer 513. The coil body 57 includes multiple planar coil layers 571 spaced from each other, and an electric connection portion 573 for electrically connecting adjacent planar coil layers 571 in series. The intermediate insulation layer 515 is arranged between every two adjacent planar coil layer 571. The through hole 51C is filled with the electric connection portion 573.

Please refer to FIGS. 13-21, the process method for integrating the coil 55 into the substrate 51 includes the following steps:

Step 1: depositing the planar coil layer 571 on the first insulation layer 511;

Step 2: depositing a raw intermediate insulation layer 55A on the planar coil layer 571;

Step 3: etching the raw intermediate insulation layer 55A to form the though hole 51C and the third hole 51D and then obtain the intermediate insulation layer 515;

Step 4: depositing the electric connection portion 573 in the through hole 51C;

Step 5: depositing the second electric portion 585 in the third hole 51D;

Step 6: depositing the planar coil layer 571 on the intermediate insulation layer 515;

Step 7: repeating steps 2-6 successively;

Step 8: depositing a raw second insulation layer 55B on the planar coil layer 571;

Step 9: etching the raw second insulation layer 55B to form a first hole 51A and the second hole 51B and then obtain the second insulation layer 513;

Step 10: depositing the first electric portion 583 into the first hole 51A;

Step 11: depositing the second lead wire 59 into the second hole 51B;

In this embodiment, the first insulation layer 511 is deposited on the membrane 531. The circuit board 1 is monolayer. A connection circuit 17 integrated into the circuit board 1 extends from the inner surface 13 to the outer surface 11. The connection circuit 17 electrically connects to external circuit on the outer surface 11. The connection circuit 17 electrically connects to the first lead wire 58 and the second lead wire 59 on the inner surface 13.

For facilitating the electric connection between the connection circuit 17 and the external circuit, the connection circuit 17 includes a third solder pad 171 and a fourth solder pad 173 formed on the outer surface 11 for electrically connecting with external circuit.

Figure 22:
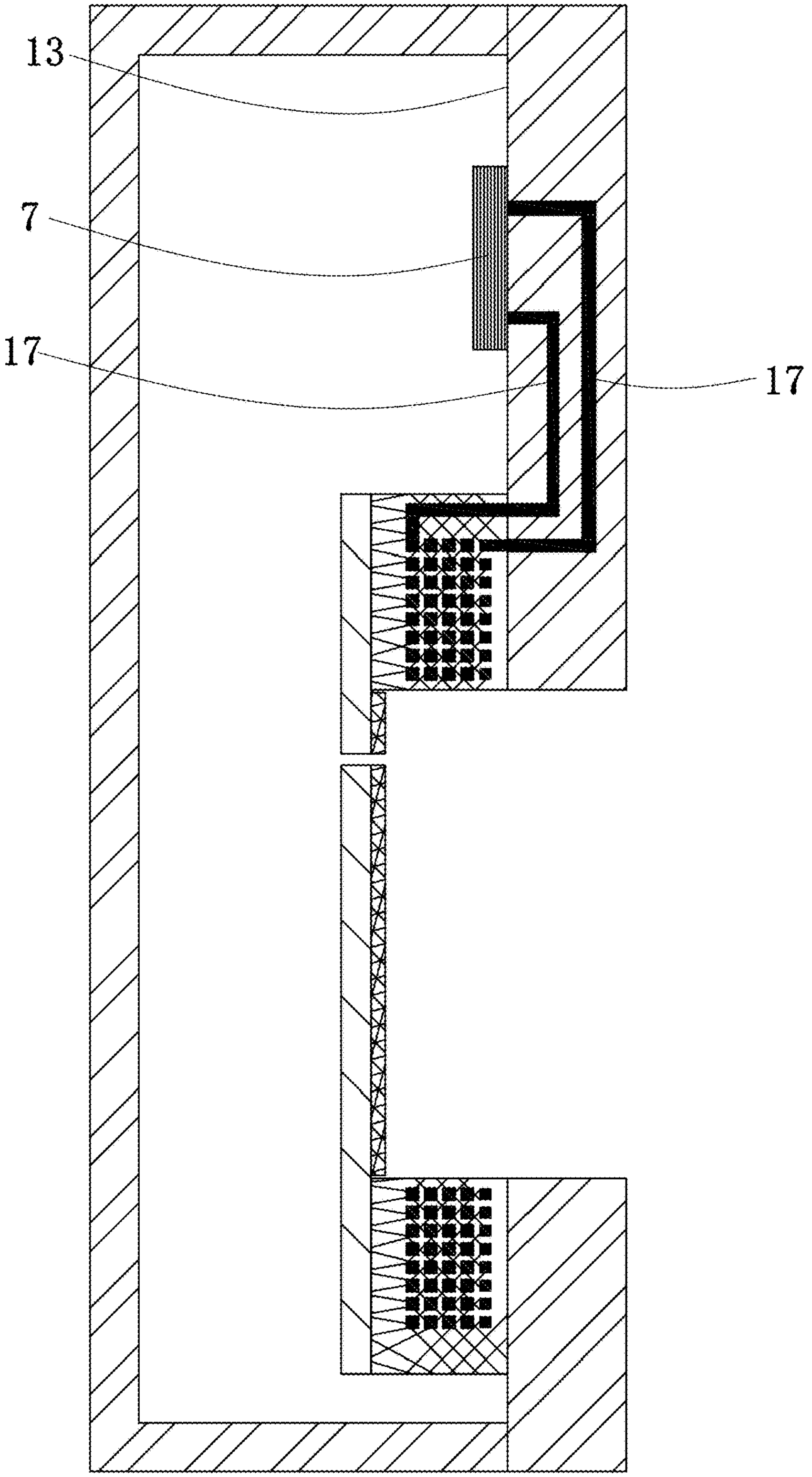
FIG. 22 is a schematic diagram of an electromagnetic microphone in accordance with fourth exemplary embodiment of the present disclosure.

Please refer to FIGS. 9-10 and FIG. 22, an electromagnetic microphone provided by fourth exemplary embodiment of the present disclosure is presented. The only difference from the electromagnetic microphone in the third exemplary embodiment is that the magnetic microphone further includes an ASIC chip 7 fixed to the inner face 13.

One end of the connection circuit 17 is electrically connected to the first lead wire 58 and the second lead wire 58 on the inner surface 13, the other end of the connection circuit 17 is electrically connected to the ASIC chip 7 on the inner surface 13.

It is to be understood, however, that even though numerous characteristics and advantages of the present exemplary embodiments have been set forth in the foregoing description, together with details of the structures and functions of the embodiments, the disclosure is illustrative only, and changes may be made in detail, especially in matters of shape, size, and arrangement of parts within the principles of the invention to the full extent indicated by the broad general meaning of the terms where the appended claims are expressed.

What is claimed is:

1. An electromagnetic microphone comprising:
- a housing;
- a circuit board engaged with the housing for enclosing a receiving space; and
- a sound transducer received in the receiving space, comprising:
  - a substrate including a back cavity,
  - a vibrator mounted on a side of the substrate away from the circuit board and covering the back cavity, including:
    - a membrane; and
    - a magnetic component mounted on the membrane and configured to generate magnetic field;
  - a coil located within the magnetic field of the magnetic component;
- wherein a sound hole penetrated on the housing or the circuit board is configured to communicate with the back cavity; when external sound wave transmitted from the sound hole and the back cavity acts on the membrane, the magnetic component and the coil interact to generate electrical signal.

2. The electromagnetic microphone as described in claim 1, wherein the magnetic component is a magnetic film.

3. The electromagnetic microphone as described in claim 1, wherein the magnetic component is configured to generate anisotropic magnetic field.

4. The electromagnetic microphone as described in claim 1, wherein a projection of the magnetic component along a vibration direction of the membrane is located within the back cavity.

5. The electromagnetic microphone as described in claim 1, wherein the circuit board comprises an outer surface and an inner surface opposite to each other; the substrate is mounted on the outer surface; the coil comprises a coil body, a first lead wire and a second lead wire both led out from the coil body; the magnetic field generated by the magnetic component acts on the coil body.

6. The electromagnetic microphone as described in claim 5, wherein the coil is integrated into the circuit board.

7. The electromagnetic microphone as described in claim 6, wherein the first lead wire and the second lead wire extend to the outer surface for electrically connecting with external circuit.

8. The electromagnetic microphone as described in claim 7, wherein the first lead wire comprises a first solder pad formed on the outer surface for electrically connecting with external circuit; the second lead wire comprises a second solder pad formed on the outer surface for electrically connecting with external circuit.

9. The electromagnetic microphone as described in claim 6, further comprising an ASIC chip mounted on the inner surface; the first lead wire and the second lead wire extend to the inner surface for electrically connecting with the ASIC chip.

10. The electromagnetic microphone as described in claim 9, wherein the ASIC chip comprises a signal process module electrically connecting with the coil, and a signal detection module electrically connecting with the signal process module; after being processed by the signal process module, the electrical signal is received and then output by the signal detection module for extracting information about the external sound wave.

11. The electromagnetic microphone as described in claim 10, wherein the signal detection module is configured to output a control signal to the coil according to the electrical signal for enabling the coil to generate a reverse force counteracted with the electromagnetic force of the magnetic component.

12. The electromagnetic microphone as described in claim 11, wherein the signal process module comprises a signal amplification unit electrically connected with the coil, an analog-to-digital conversion unit electrically connected with the signal amplification unit, and a filtering unit connecting the analog-to-digital conversion unit with the signal detection module.

13. The electromagnetic microphone as described in claim 6, wherein the coil body comprises multiple planar coil layers spaced and stacked along a vibration direction of the membrane, and an electric connection portion for electrically connecting adjacent planar coil layers in series; the circuit board comprises a connection hole arranged between adjacent planar coil layers; the connection hole is filled with the electric connection portion; the multiple planar coil layers comprises a first planar coil layer leading out the first lead wire, and a second planar coil layer leading out the second lead wire.

14. The electromagnetic microphone as described in claim 5, wherein the coil is integrated into the substrate.

15. The electromagnetic microphone as described in claim 14, wherein the first lead wire and the second lead wire both extend to a side of the substrate away from the membrane; the circuit board comprises a connection circuit integrated therein extending from the inner surface to the outer surface to electrically connect with external circuit; the connection circuit electrically connects with the first lead wire and the second lead wire on the inner surface.

16. The electromagnetic microphone as described in claim 15, wherein the connection circuit comprises a third solder pad and a fourth solder pad formed on the outer surface for electrically connecting with external circuit.

17. The electromagnetic microphone as described in claim 14, further comprising an ASIC chip mounted on the inner surface; the circuit board comprises a connection circuit integrated therein; the first lead wire and the second lead wire both extend to a side of the substrate away from the membrane; one end of the connection circuit is electrically connected with the first lead wire and the second lead wire on the inner surface, the other end of the connection circuit is electrically connected with the ASIC chip on the inner surface.

18. The electromagnetic microphone as described in claim 14, wherein the substrate comprises a first insulation layer fixed to the membrane, a second insulation layer fixed to the inner surface, and an intermediate insulation layer; the second insulation layer comprises a first hole and a second hole penetrating thereon; the second hole is filled with the second lead wire; the intermediate insulation layer comprises a through hole and a third hole penetrating thereon, the third hole communicates with the first hole; the first lead wire comprises a first electric portion filling the first hole, and a second electric portion filling the third hole; the coil body is sandwiched between the first insulation layer and the second insulation layer; the coil body comprises multiple planar coil layers spaced from each other, and an electric connection portion for electrically connecting adjacent planar coil layers in series; the intermediate insulation layer is arranged between every two adjacent planar coil layer; the through hole is filled with the electric connection portion.

* * * * *